(No Model.) 2 Sheets—Sheet 1.
R. E. ROSE.
DREDGING AND EXCAVATING MACHINE.
No. 279,599. Patented June 19, 1883.

WITNESSES
INVENTOR
R. E. Rose (No Model.) 2 Sheets—Sheet 2.
R. E. ROSE.
DREDGING AND EXCAVATING MACHINE.

No. 279,599. Patented June 19, 1883.

UNITED STATES PATENT OFFICE.

RUFUS E. ROSE, OF KISSIMMEE, FLORIDA.

DREDGING AND EXCAVATING MACHINE.

SPECIFICATION forming part of Letters Patent No. 279,599, dated June 19, 1883.

Application filed December 27, 1882. (No model.)

*To all whom it may concern:*

Be it known that I, R. E. ROSE, of Kissimmee, in the county of Orange and State of Florida, have invented certain new and useful Improvements in Dredges and Excavating-Machines; and I do hereby declare the following to be a full, clear, and exact description of the invention, such as will enable others skilled in the art to which it appertains to make and use the same.

My invention relates to an improvement in excavating and dredging machines, the object of the same being to provide simple and effective means for connecting the buckets to the endless chains, whereby the contents of the buckets are easily and quickly discharged.

A further object is to provide means for taking the wear from the buckets and chains while in motion, and also considerably lessening the friction.

With these ends in view my invention consists in the parts and combinations of parts as will be more fully explained, and pointed out in the claims.

Figure 1:
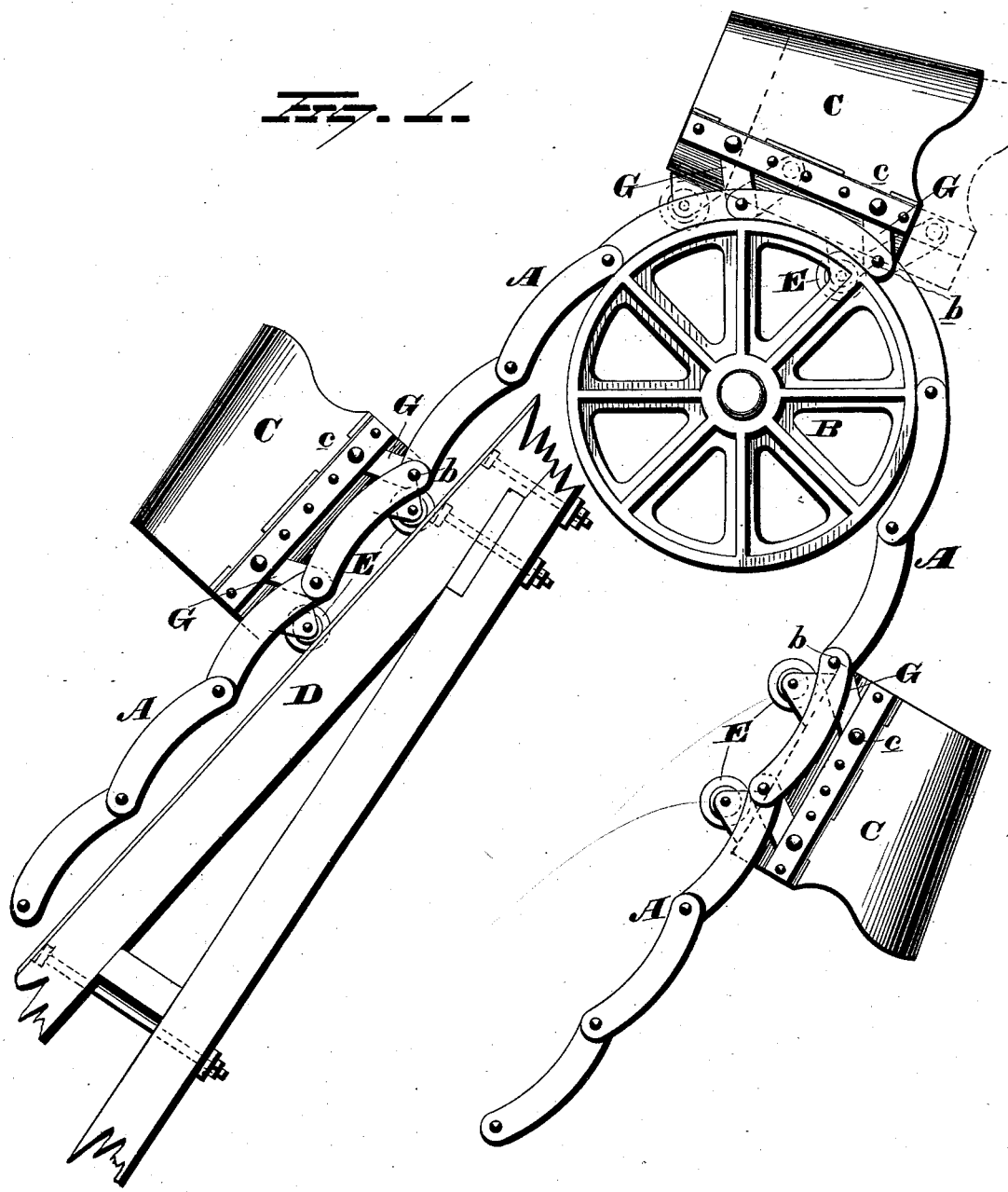
Figure 2:
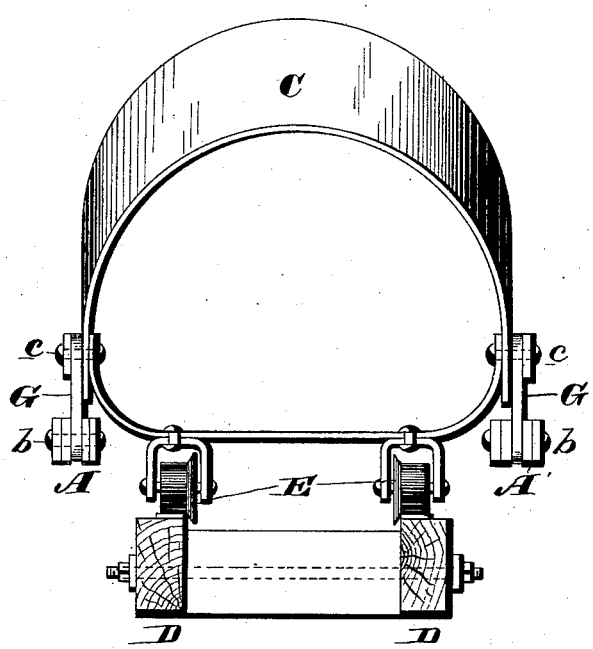

In the accompanying drawings, Figure 1 is a view in side elevation of a section of endless chains embodying my invention; and Fig. 2 is a transverse sectional view, showing the trackway, a bucket, and the chains.

A A' represent parallel endless chains supported on chain-wheels B, and provided with the buckets C, each of which latter is preferably made from a single piece of sheet metal cut and bent into the desired form.

D are guides secured in any suitable manner to the dredge or excavator frame, and adapted to form a trackway for the support of the loaded buckets passing upward. This trackway starts at the lower drum or chain wheel and terminates at the upper wheel B, and forms a support for the loaded buckets, and also for the section of the chains to which the loaded buckets are secured.

In the old style of dredges the bucket and chain rested upon an iron track or bucket-guide, which, besides producing considerable friction, also caused considerable wear to the parts. They have also been provided with side guards to retain the buckets centrally on the bucket-guide; but this is also objectionable, for the reason that, besides producing considerable friction, the rivet-heads of the buckets were exposed to constant wear, which was a source of great annoyance; but by my improvement these objectionable features are obviated by the flanged wheels E, four of which are journaled to the under side of each bucket, and are adapted to run on the trackway D as the buckets ascend with their loads, and consequently elevate the buckets and chains above the said trackway.

Each bucket C is provided on its lower or inner face with four depending bearings, placed as shown, in which the flanged wheels E are journaled. These flanged wheels are only brought into operation while the loaded buckets are ascending, and while the buckets are turning on the chain-wheels B. The buckets C rest inside or between the chains A A', and are connected thereto by the pivoted links G, two or more of which are arranged on each side of a bucket. The lower ends of the links are pivotally connected to the bolts b, which latter also serve to connect two links of the chain together, and the upper ends thereof are pivotally connected to the sides of the buckets by the rivets or bolts c. These links are sufficiently long to enable the buckets to move forward and backward, as shown in dotted lines in Fig. 1, for the purpose of discharging the contents thereof. When the links G stand at right angles to the endless chains, the buckets are elevated, so that the flanged wheels are out of contact with the trackway; but this only occurs while the buckets are turning the top wheel to descend, and turning the lower wheel or drum to ascend. When the buckets are ascending, the links incline backward and draw the buckets upward toward the wheel B. When the wheel is reached, and as soon as the buckets begin to turn thereon, or when they reach the center of gravity, the weight of the bucket and its contained load causes it (the bucket) to move upward and forward in the arc of a circle until the links incline forward. This sudden movement of the bucket loosens the contained earth and causes it to readily escape, the movement of the bucket being very similar to the back jerk of a workman throwing dirt from a shovel.

The operation of my improved device is as follows: Motion is imparted to the endless chain in any desired manner, and the latter moves around the wheels or drums situated at the turning-point of the chain. The buckets engage the earth, and are loaded while turning on the lower drum, and then pass around the same onto the trackway, which latter sustains the entire weight of the load and saves considerable wear of the buckets and chains. While the bucket is turning on the upper wheel B, and as soon as it passes the center of gravity, it shoots forward, and by the sudden shock loosens the contained earth and causes it to fall therefrom into a suitable scow or receptacle adapted to receive it.

My improved bucket has no movable parts, and is not liable to get out of repair. They can be attached to any dredge or excavator working on this principle, and they can be manufactured at a small initial cost.

It is evident that slight changes in the construction and relative arrangement of the several parts might be resorted to without departing from the spirit of my invention; and hence I would have it understood that I do not limit myself to the exact construction shown and described, but consider myself at liberty to make such changes and alterations therein as fairly fall within the spirit and scope of my invention.

I am aware that a dredger-bucket has had its forward end connected to its driving-chain by a loop pivoted to the bucket and engaging loosely with one of the links of the chain; but in such instance the rear end of the bucket has been directly secured with the axle of its carriage, and therefore the bucket cannot have the rising motion and forward pitch which its connection with the chain entirely by swinging links, as in my invention, permits it to have, and which gives it the prompt and efficient dump which is characteristic of my dredger.

Having fully described my invention, what I claim as new, and desire to secure by Letters Patent, is—

1. In a dredging-machine, the combination, with two endless chains, of the buckets secured thereto entirely by means of the pivoted swinging links, substantially as described.

2. The combination, with the endless chains, the buckets provided with flanged roller-wheels, and the links for loosely connecting the buckets to the chains independently of the wheel-supports and near both ends of the buckets, of the trackway on which the flanged wheels run while the buckets are ascending with their loads, all of the above parts constructed, combined, and adapted to operate as described.

In testimony whereof I have signed this specification in the presence of two subscribing witnesses.

RUFUS E. ROSE.

Witnesses:
J. E. EDMONSON,
A. J. DAVENPORT.